(12) United States Patent
Lazzarin et al.

(10) Patent No.: US 12,060,952 B2
(45) Date of Patent: Aug. 13, 2024

(54) APPARATUS, SYSTEM AND METHOD FOR JOINING ELONGATED ELEMENTS IN A BODY OF WATER

(71) Applicant: SAIPEM S.P.A., San Donato Milanese (IT)

(72) Inventors: Diego Lazzarin, San Donato Milanese (IT); Loris Ziero, San Donato Milanese (IT); Gabriele Cadeddu, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 195 days.

(21) Appl. No.: 17/797,636

(22) PCT Filed: Feb. 12, 2021

(86) PCT No.: PCT/IB2021/051198
§ 371 (c)(1),
(2) Date: Aug. 4, 2022

(87) PCT Pub. No.: WO2021/161258
PCT Pub. Date: Aug. 19, 2021

(65) Prior Publication Data
US 2023/0057030 A1 Feb. 23, 2023

(30) Foreign Application Priority Data
Feb. 12, 2020 (IT) .................. 102020000002776

(51) Int. Cl.
*F16L 1/20* (2006.01)
*B63G 8/00* (2006.01)
(Continued)

(52) U.S. Cl.
CPC ............... *F16L 1/24* (2013.01); *B63G 8/001* (2013.01); *F16L 1/23* (2013.01); *F16L 3/233* (2013.01); *B63G 2008/005* (2013.01)

(58) Field of Classification Search
CPC .... F16L 1/20; F16L 1/24; F16L 3/233; B63G 8/001; B63G 2008/005; B63G 2008/007; E21B 17/1035; E21B 41/04
See application file for complete search history.

(56) References Cited

U.S. PATENT DOCUMENTS

| | | | |
|---|---|---|---|
| 3,018,596 A | 1/1962 | Dvorak et al. | |
| 3,381,485 A * | 5/1968 | Crooks | .................. B25J 19/023 414/626 |

(Continued)

FOREIGN PATENT DOCUMENTS

| | | |
|---|---|---|
| EP | 2 896 469 A1 | 7/2015 |
| FR | 2 306 882 A1 | 11/1976 |

(Continued)

OTHER PUBLICATIONS

Notification Concerning Submission, Obtention or Transmittal of Priority Document for International Application No. PCT/IB2021/051198 dated Feb. 17, 2021.

(Continued)

*Primary Examiner* — Benjamin F Fiorello
(74) *Attorney, Agent, or Firm* — Neal, Gerber & Eisenberg LLP

(57) ABSTRACT

An apparatus for joining elongated elements in a body of water has a frame; a strap feeding device; two arms movable with respect to the frame and configured to guide a strap around the elongated elements; a clamping device, configured to retain an end portion of the strap; a driving device configured to advance and tighten the strap around the elongated elements; a junction device, configured to join two overlapping portions of the strap so as to close the strap (Continued)

around the elongated elements; and a cutting device configured to separate the strap upstream of the joined portion.

18 Claims, 5 Drawing Sheets

(51) Int. Cl.
  *F16L 1/23* (2006.01)
  *F16L 1/24* (2006.01)
  *F16L 3/233* (2006.01)

(56) References Cited

U.S. PATENT DOCUMENTS

| | | | | | |
|---|---|---|---|---|---|
| 3,434,682 | A | * | 3/1969 | Nestlerode, Sr. | ......... F16L 1/20 248/230.8 |
| 3,470,813 | A | * | 10/1969 | Mihkel | .................. B65B 13/06 100/31 |
| 4,252,157 | A | * | 2/1981 | Ohnishi | .................. B65B 27/10 100/31 |
| 4,602,893 | A | * | 7/1986 | Gist | ........................ E21B 41/04 29/451 |
| 4,705,331 | A | * | 11/1987 | Britton | .................... B63C 11/52 269/254 R |
| 2003/0121424 | A1 | * | 7/2003 | Doyle | ..................... B65B 13/18 100/29 |
| 2008/0245933 | A1 | * | 10/2008 | Stokes | ................. E21B 17/012 248/74.1 |
| 2011/0176125 | A1 | * | 7/2011 | Smith | ..................... G01L 1/246 356/32 |
| 2014/0273677 | A1 | * | 9/2014 | Critsinelis | ............... F16L 1/123 405/171 |
| 2016/0258235 | A1 | * | 9/2016 | Smith | .................... B63G 8/001 |
| 2023/0358337 | A1 | * | 11/2023 | Lazzarin | ................. H02G 1/06 |

FOREIGN PATENT DOCUMENTS

| WO | WO 2007/105962 A1 | 9/2007 |
|---|---|---|
| WO | WO 2016/128893 A1 | 8/2016 |

OTHER PUBLICATIONS

International Search Report and Written Opinion for International Application No. PCT/IB2021/051198 dated May 28, 2021.

\* cited by examiner

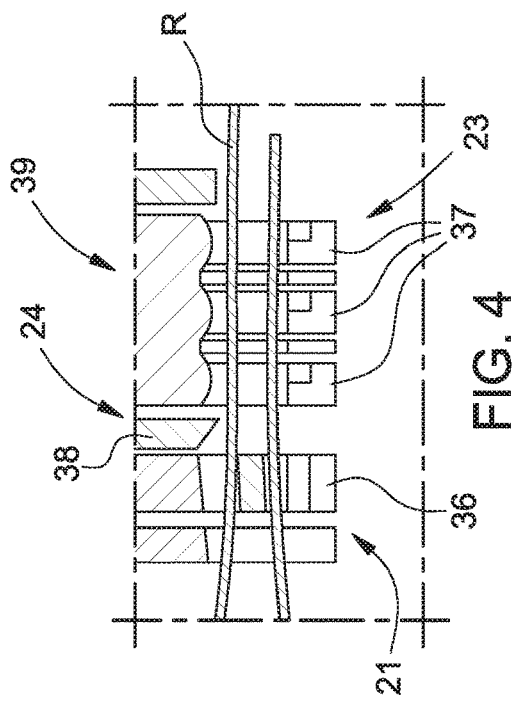
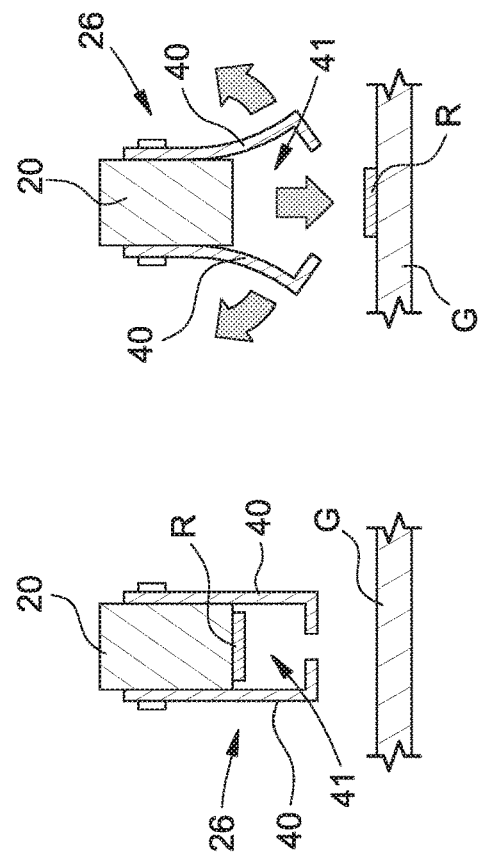
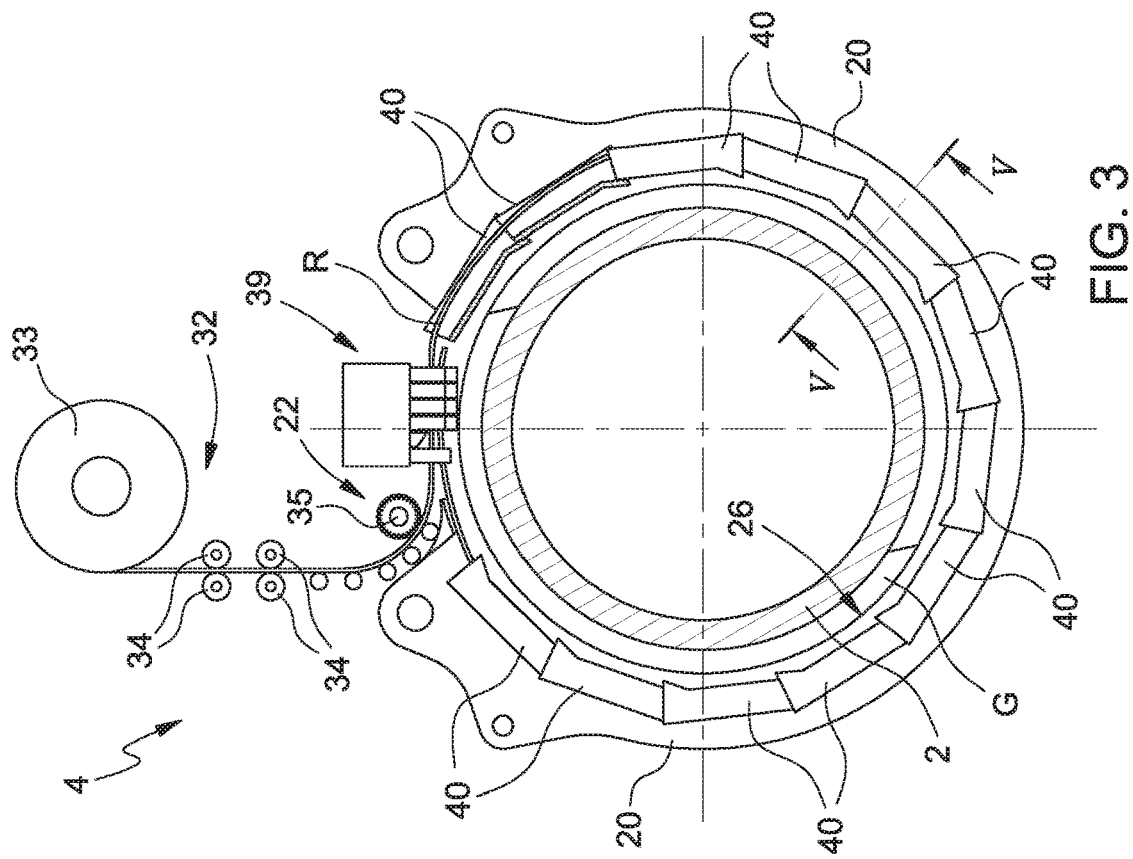

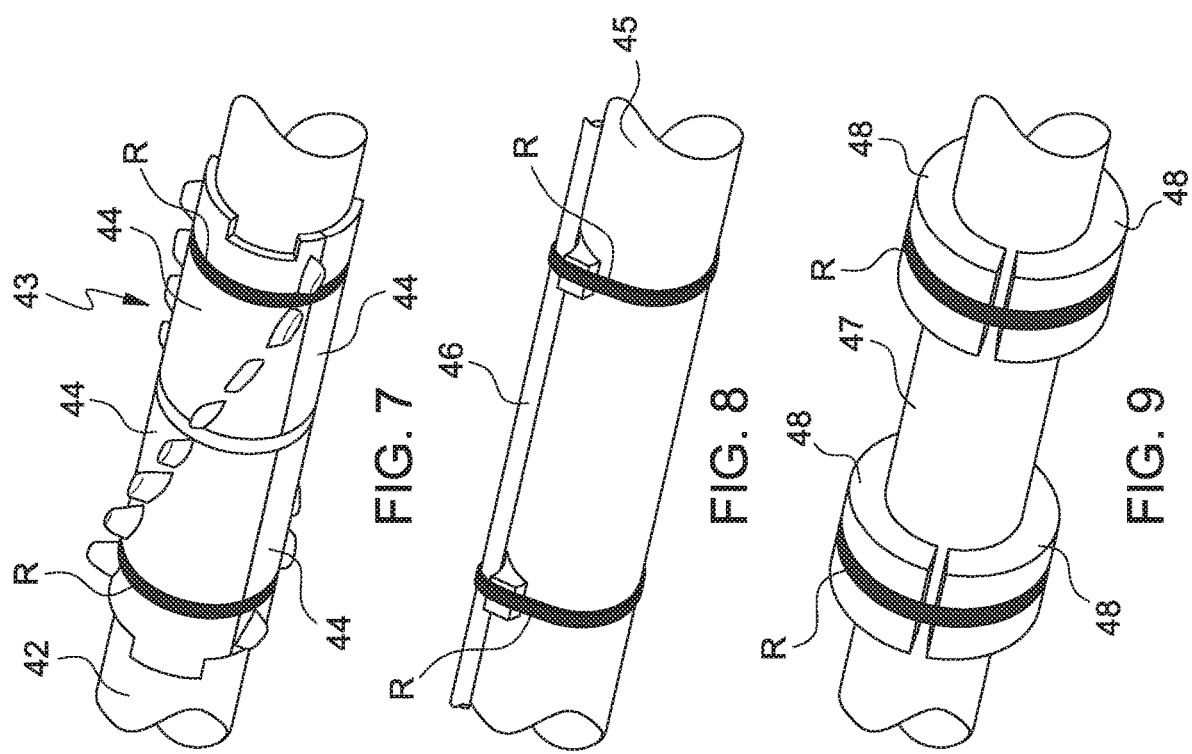
FIG. 10
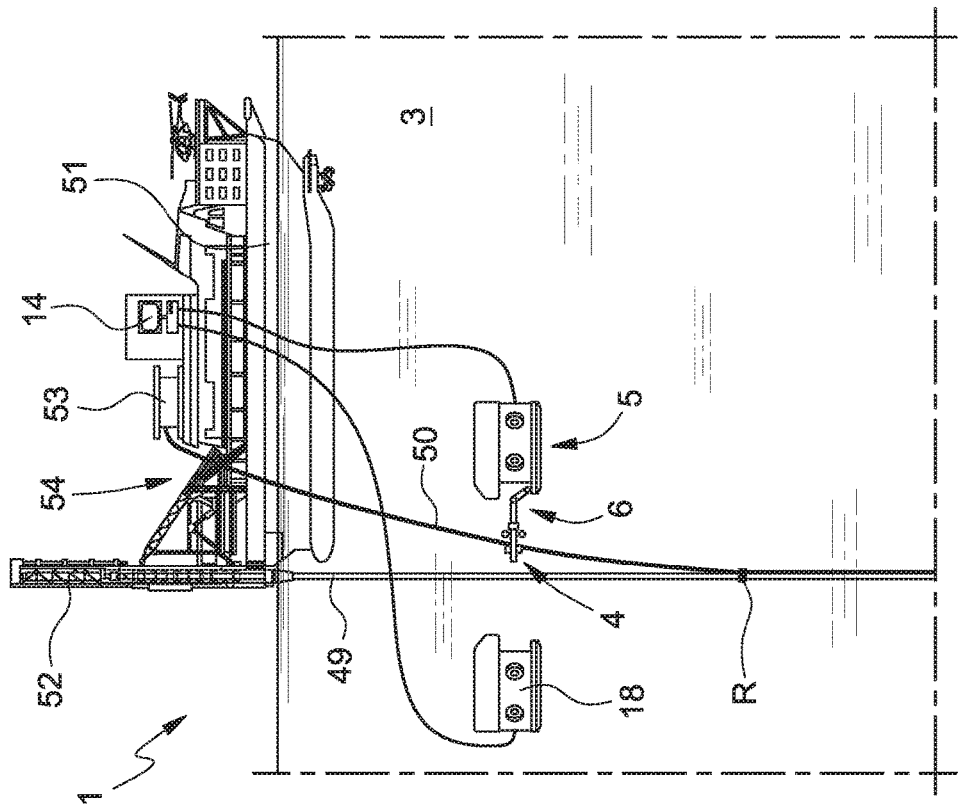
FIG. 7
FIG. 8
FIG. 9

APPARATUS, SYSTEM AND METHOD FOR JOINING ELONGATED ELEMENTS IN A BODY OF WATER

PRIORITY CLAIM

This application is a national stage application of PCT/IB2021/051198, filed on Feb. 12, 2021, which claims the benefit of and priority to Italian Patent Application No. 102020000002776, filed on Feb. 12, 2020, the entire contents of which are each incorporated by reference herein.

TECHNICAL FIELD

The present disclosure relates to an apparatus and a system for joining elongated elements in a body of water.

The present disclosure further relates to a method for joining elongated elements by such an apparatus.

BACKGROUND

In the oil & gas sector, recent technological developments in underwater devices suitable for operating at relatively great depths and the interest of oil companies have facilitated the spread of underwater systems for the extraction, production and/or transport of hydrocarbons. Such underwater systems can be placed onto the bed of a body of water or at intermediate positions depending on the configuration of the well or field of wells. In addition, underwater systems can be placed in relatively shallow or relatively very deep waters and in all geographic areas regardless of whether the environmental conditions are relatively easy or relatively extreme.

In the steps of installation and maintenance of underwater systems, there is currently a need to join elongated elements, such as for example to join shells or cups or floats to pipes, or cables and pipes, to form bundles of pipes or mixed bundles of pipes (rigid or flexible) and cables.

In particular, in currently known underwater systems, some pipes, especially risers or jumpers or spools, are equipped with floating shells to reduce the weight of the risers or jumpers or spools, or with shells equipped with fins shaped so as to mitigate the wake turbulence and reduce the vibrations induced by these wakes on said pipes. The shells are formed by a series of facing half-shells.

According to the prior art, the joining between the shells and the pipe involves removing the pipe from the underwater system, placing the pipe above the body of water, and joining the half-shells to the pipe. This operation is relatively costly in terms of downtime of the underwater system.

SUMMARY

One object of the present disclosure is to provide an apparatus for joining elongated elements, which can overcome certain of the drawbacks of certain of the prior art.

Therefore, according to certain embodiments of the present disclosure, there is provided an apparatus for joining elongated elements in a body of water. In such embodiments, the apparatus includes a frame; a strap feeding device; two arms moveable with respect to the frame and configured to guide a strap around the elongated elements; a clamping device configured to retain an end portion of the strap; a driving device configured to advance and tighten the strap around the elongated elements; a junction device configured to join two overlapping portions of the strap so as to close the strap around the elongated elements; and a cutting device configured to separate the strap upstream of the joined portion.

The present disclosure enables straps to be applied around elongated elements in an underwater environment, thus avoiding bringing the elongated elements to the surface, with consequent saving of time and resources.

In particular, if the elongated elements are an integral part of an underwater system for the production or transport of hydrocarbons, the underwater system can be kept in operation during the operations involved in applying the straps around the elongated elements.

Moreover, the apparatus is relatively flexible, adaptable to different types of elongated elements, and not relatively bulky.

In certain embodiments, each arm comprises a guide configured to enable the strap to advance along the arm. Each guide is bounded by facing fins, which are mounted on the arm, are shaped to define a guide channel for the strap and have a stiffness so as to enable the facing fins to be opened wide and the strap to be pulled out of the guide when the strap is tightened around the elongated elements. In this way, the strap can be guided around the elongated elements and pulled out of the guide in a simple and reliable manner, thus limiting the number and complexity of the components of the apparatus.

In certain embodiments, the apparatus comprises actuators to operate the arms and an emergency device configured to deactivate the actuators or release the actuators from the arms so that the apparatus can be decoupled from the elongated elements. In this way, the apparatus can be removed from the elongated elements in a relatively simple and quick way.

A further object of the present disclosure is to provide a system for joining elongated elements in a body of water, which overcomes or at least mitigates certain of the recognized drawbacks of certain of the prior art.

Therefore, according to certain embodiments of the present disclosure, there is provided a system for joining elongated elements in a body of water. In these embodiments, the system includes the apparatus disclosed herein; an underwater vehicle; and an articulated arm connected to the underwater vehicle and to the apparatus, to control the position of the apparatus. In this way, straps can be applied around elongated elements in an underwater environment, in a relatively simple and inexpensive way.

In particular, the underwater vehicle is a Remote Operated Vehicle ("ROV"). In this way, the underwater vehicle can be controlled remotely.

In certain embodiments, the control device comprises a first sensor, which is coupled to one of the two movable arms and is configured to monitor the position of the apparatus with respect to the elongated elements and/or to monitor the relative position of the two movable arms; in particular, the first sensor may be a linear probe or a magnetic or ultrasonic presence sensor or a camera. In this way, the articulated arm and the arms of the apparatus can be controlled and monitored in real time.

In certain embodiments, the control device comprises a second sensor coupled to the frame to monitor the presence of the strap in a given or designated position, the junction device being controlled as a function of the signals provided by the second sensor. In this way, the junction device and the outcome of the strap application operations can be controlled and monitored in real time.

A further object of the present disclosure is to provide a method for joining elongated elements in a body of water, which overcomes or at least mitigates certain of the recognized drawbacks of certain of the prior art.

Therefore, according to certain embodiments of the present disclosure, there is provided a method for joining elongated elements in a body of water by the apparatus described herein. In such embodiments, the method includes: placing the apparatus in a body of water at a given or designated zone of the elongated elements; coupling the apparatus to the elongated elements by an underwater vehicle and an articulated arm placed between the underwater vehicle and the apparatus at the said zone; guiding the strap around the elongated elements by two arms of the apparatus; tightening the strap around the elongated elements; and joining two overlapping portions of the strap so that the strap is closed around the elongated elements. In this way, a strap can be applied in the body of water around a selected zone of the elongated elements in a relatively inexpensive and reliable manner.

In accordance with certain embodiments of the present disclosure, the method includes launching a first elongated element into a body of water; launching a second elongated element into the body of water near the first elongated element; placing the first and the second elongated element close together in the said body of water by at least one underwater vehicle; and joining the first and the second elongated element by straps. In this way, the first and the second elongated element are joined to each other as they are launched by a laying vessel.

BRIEF DESCRIPTION OF THE DRAWINGS

Further features and advantages of the present disclosure will be apparent from the following description of a non-limiting embodiment thereof, with reference to the accompanying drawings, wherein:

FIG. 3 is a further enlarged, side elevation view, with parts removed for clarity and parts in section, of a detail of FIG. 2;

FIG. 4 is a further enlarged, sectional view, with parts removed for clarity, of a detail of FIG. 3 sectioned along a plane parallel to the plane of the sheet;

FIGS. 5 and 6 are further enlarged, sectional views, with parts removed for clarity, of a detail of FIG. 3 in accordance with the section lines V-V and in two operating configurations, respectively;

FIGS. 7, 8 and 9 are perspective views, with parts removed for clarity, of respective elongated elements joined to each other by the system and method of the present disclosure; and FIGS. 10, 11 and 12 are schematic, side elevation views, with parts removed, of an application of the system and method of the present disclosure for joining elongated and continuous elements in a body of water.

DETAILED DESCRIPTION

Figure 1:
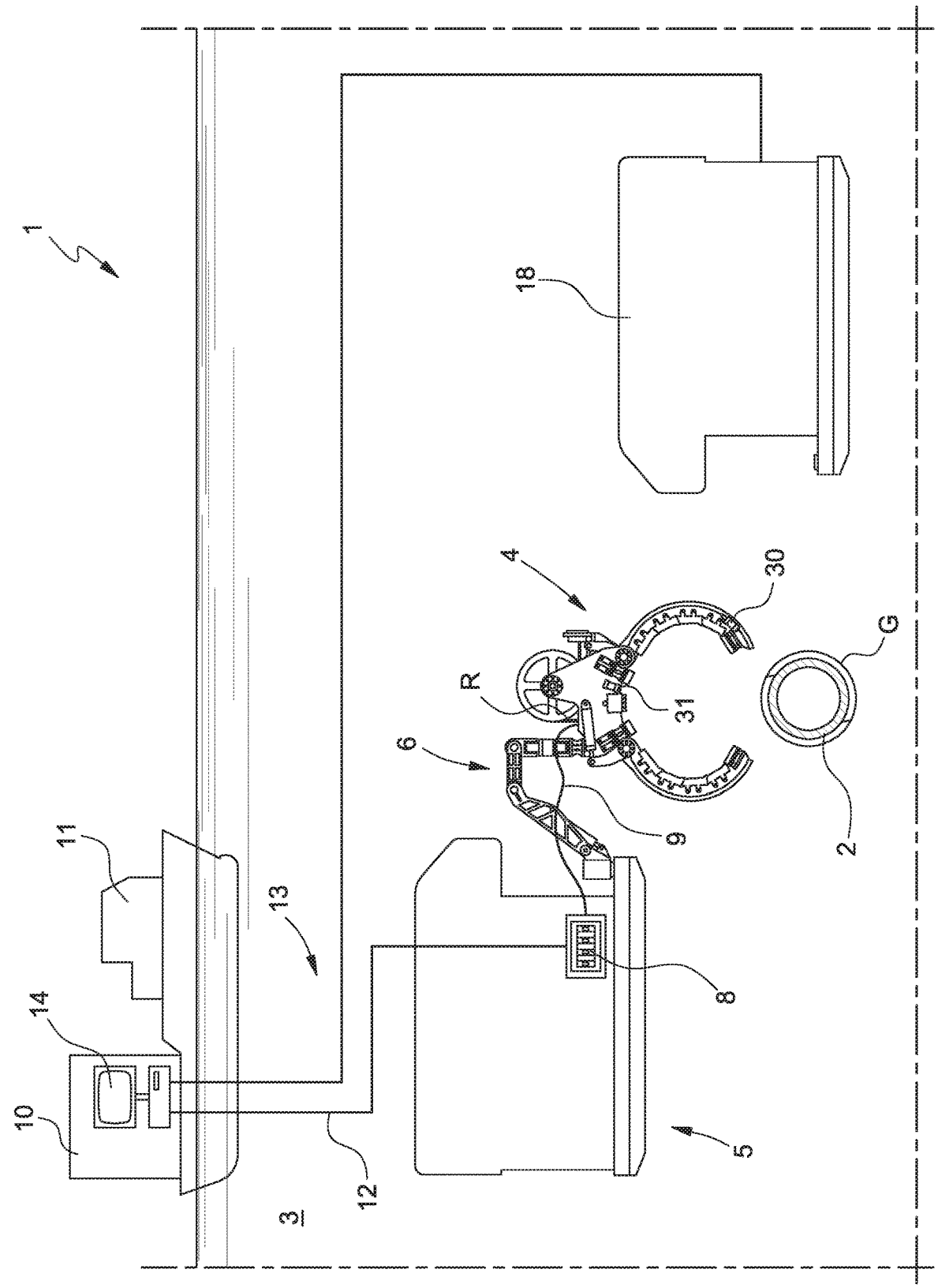
FIG. 1 is a side elevation view, with parts removed and parts schematized, of a system for joining elongated elements in accordance with the present disclosure.

With reference to FIG. 1, number 1 indicates, as a whole, a system used for joining elongated elements 2 and G in a body of water 3, and in particular for linking elongated elements 2 and G located in a body of water 3.

The system 1 comprises an apparatus 4 configured to apply straps around the elongated elements 2 and G; an underwater vehicle 5, which is movable in the body of water 3; and an articulated arm 6, which is connected to the underwater vehicle 5 and to the apparatus 4 to control the position of the apparatus 4 in the body of water 3.

In the example described and illustrated herein, the underwater vehicle 5 is a ROV. The underwater vehicle 5 comprises a hydraulic unit 8, configured to transmit power to the apparatus 4 and to the arm 6 through one or more supply pipes and/or cables 9.

Furthermore, the system 1 comprises a surface station 10, which is, in certain instances, located on a support vessel 11 and is connected to the underwater vehicle 5 by an umbilical 12, and a control device 13 comprising a control unit 14 located at the surface station 10 to control the underwater vehicle 5, the apparatus 4 and the articulated arm 6.

The umbilical 12 is configured to supply electrical power to the underwater vehicle 5 and to exchange signals with the underwater vehicle 5, which in turn exchanges signals with the apparatus 4.

In certain embodiments, the control unit 14 supplies the signals exchanged with the underwater vehicle 5 to an operator, who gives commands to the control unit 14, which are transmitted to the underwater vehicle 5 through the umbilical 12.

Moreover, the system 1 comprises a support underwater vehicle 18 configured to check the strap R application operations and/or to intervene in case of emergency.

In particular, the underwater vehicle 18 is configured to provide the control unit 14 with images and/or videos of the operations of application of the strap R around the elongated elements 2 and G, and to decouple the apparatus 4 from the elongated elements 2 and G in case of failure or malfunction of the apparatus 4.

In the example described and illustrated herein (which does not limit the present disclosure), the underwater vehicle 18 is a ROV. In accordance with another embodiment (not shown in the drawings), the underwater vehicle 18 is an Autonomous Underwater Vehicle ("AUV").

Figure 2:
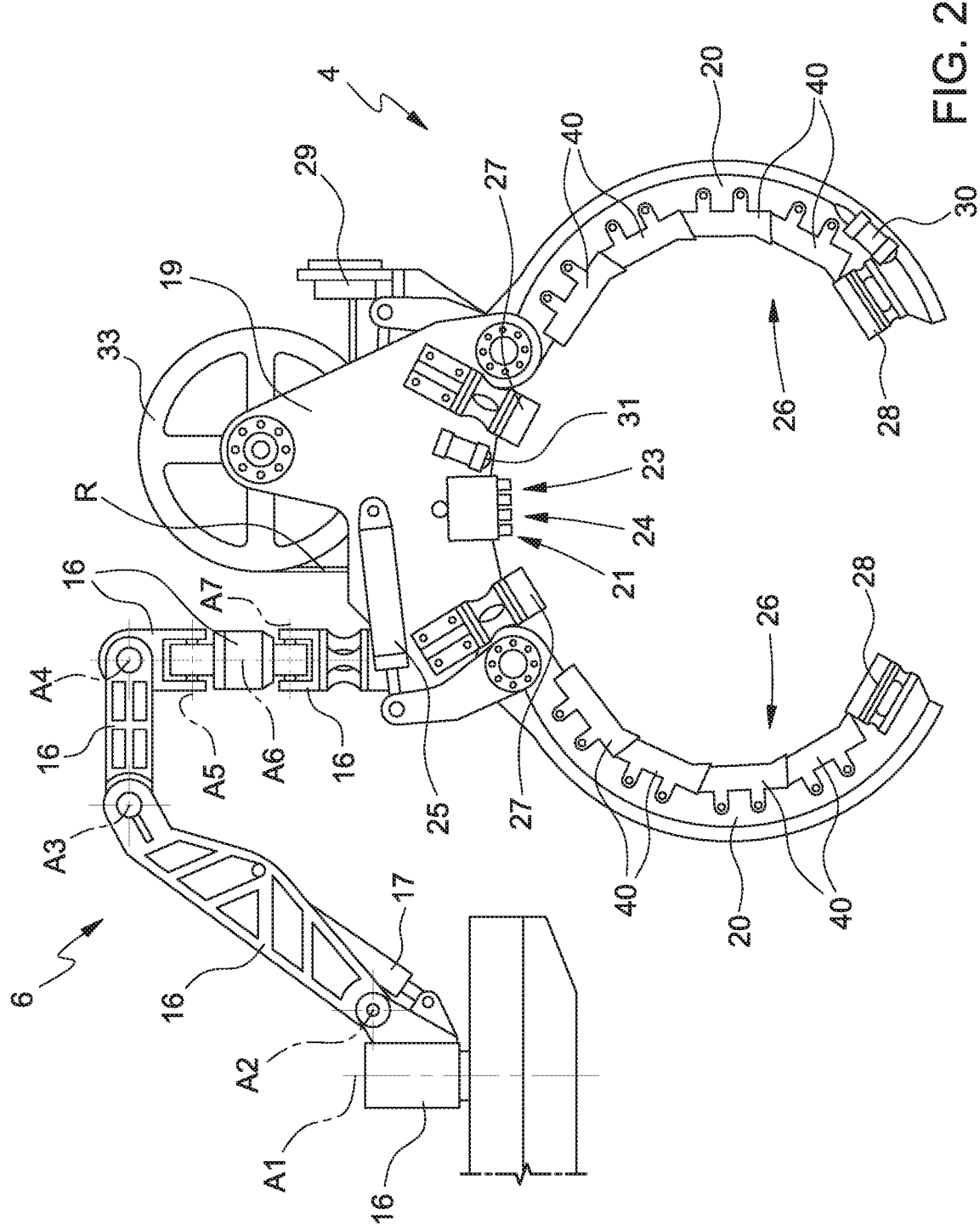
FIG. 2 is an enlarged, side elevation view of an apparatus of the system of FIG. 1.

With reference to FIG. 2, the articulated arm 6 comprises a plurality of elements 16 articulated with each other, and a plurality of hydraulic actuators 17 to control the position of the elements 16 with respect to each other, to the underwater vehicle 5 and to the apparatus 4. In particular, the elements 16 are coupled so as to give the articulated arm 6 seven degrees of freedom. In the example shown herein, the elements 16 are articulated with each other around the following axes of rotation A1, A2, A3, A4, A5, A6 and A7.

The apparatus 4 comprises a frame 19; two arms 20 movable with respect to the frame 19 and configured to guide the strap R around the elongated elements 2 and G; a clamping device 21 configured to retain an end portion of the strap R; a driving device 22 configured to advance and tighten the strap R around the elongated elements 2 and G; a junction device 23 configured to join two overlapping portions of the strap R so as to close the strap R around the elongated elements 2 and G; and a cutting device 24 configured to separate the strap R upstream of the joined portion.

The two arms 20 are hinged to the frame 19 and are moveable between an open position to enable the apparatus 4 to be arranged around the elongated elements 2 and G, and a closed position, in which the arms 20 and the frame 19 form a closed ring around the elongated elements 2 and G. In particular, each arm 20 is moved by a hydraulic cylinder 25, which is mounted on the frame 19.

Moreover, each arm 20 comprises a guide 26 configured to enable the strap R to advance along the arm 20.

In addition, the apparatus 4 comprises two spacers 27, mounted on the frame 19, two spacers 28, each mounted on a respective arm 20, and an emergency device 29 configured to decouple the apparatus 4 from the elongated elements 2 and G.

The spacers 27 and 28 are configured to rest on the elongated elements 2 and G when the arms 20 are arranged in the closed position around the elongated members 2 and G, so as to space the guide 26 from the elongated elements 2 and G.

It should be appreciated that the number and position of the spacers 27 and 28 (shown in the accompanying drawings) are given purely by way of example and should not be construed as limiting the scope of protection of the present disclosure.

The emergency device 29 is configured to be actuated by the underwater vehicle 18, and by a release mechanism (not shown in the drawings), moves the arms 20 from the closed position to the open position, so as to release the apparatus 4 from the elongated elements 2 and G. In practice, the emergency device 29 is configured to discharge the hydraulic actuators 25 that operate the arms 20 or to decouple the hydraulic actuators 25 from the arms 20.

The control device 13 comprises a sensor 30, which is coupled to one of the two arms 20 and is configured to monitor the position of the apparatus 4 with respect to the elongated elements 2 and G and/or to monitor the relative position of the two arms 20; and a sensor 31 coupled to the frame 19 to monitor the presence of the strap R in a given or designated position and enable the junction device 23 to be controlled as a function of the signals provided by the sensor 31.

In the example described and illustrated herein, the sensors 30 and 31 are cameras configured to provide real-time images and/or videos to the control unit 14.

In particular, the sensor 30 is mounted at one end of one of the two arms 20. The sensor 31 is mounted at the junction device 23 and checks whether the strap R is correctly inserted inside the guide 26 and monitors the outcome of the joining operation performed by the junction device 23.

With reference to FIG. 3, the apparatus 4 is shown in the closed position around the elongated elements 2 and G. in this configuration, the arms 20 and the portion of the frame 19 between the arms 20 form a closed ring around the elongated elements 2 and G.

In the example described and illustrated herein, the apparatus 4 comprises a strap feeding device 32 provided with a reel 33, on which a spool of strap R is wound, and feed rollers 34 configured to convey the strap R into the guide 26.

The driving device 22 comprises a driving roller 35 configured to selectively advance the strap R in a first direction, so as to feed the strap R to the guide 26 and unwind the strap R from the spool, and in a second direction opposite to the first direction to tighten the strap R around the elongated elements 2 and G.

With reference to FIG. 4, the clamping device 21 comprises a vice 36 configured to clamp the strap R at one end of the strap R and retain the strap R, thereby enabling the driving device 22 to clamp the strap R around the elongated elements 2 and G.

The junction device 23 comprises a plurality of grippers 37 configured to join two overlapping portions of the strap R downstream of the clamping device 21.

The cutting device 24 comprises a knife 38 arranged between the clamping device 21 and the junction device 23.

In accordance with certain, non-limiting embodiments of the present disclosure, the clamping device 21, the junction device 23 and the cutting device 24 are part of a machining head 39, mounted on the frame 19 between the arms 20.

With reference to FIG. 5, each guide 26 is bounded by facing fins 40, which are mounted on the arm 20, are shaped to define a guide channel 41 for the strap R and have a stiffness so as to enable the facing fins 40 to be opened wide and the strap R to be pulled out of the guide 26 when the strap R is tightened around the elongated elements 2 and G. In particular, each fin 40 is L-shaped and is fixed at one end to the arm 20. The free end of each fin 40 is arranged at a distance from the free end of the facing fin 40. When the strap R is tightened around the elongated elements 2 and G, each fin 40 deforms, thereby increasing the distance between the free ends of the facing fins 40 to enable the strap R to come out of the guides as shown in FIG. 6.

In use and with reference to FIG. 1, the underwater vehicle 5 is moved in the body of water 3 by the control unit 14 and arranged at the elongated elements 2 and G to be joined.

The sensor 30 monitors the position of the apparatus 4 with respect to the elongated elements 2 and G and provides the relevant signals to the control unit 14.

The apparatus 4 is moved by the articulated arm 6 as a function of the signals provided by the sensor 30, so as to couple the apparatus 4 to the elongated elements 2 and G.

Subsequently, the arms 20 are moved from the open position to the closed position and the sensor 30 monitors the relative position of the two arms 20.

During the operations involved in joining the elongated elements 2 and G, the underwater vehicle 18 monitors and provides the control unit 14 with images and/or videos of said operations and is ready to intervene in case of failure or malfunction of the apparatus 4.

With reference to FIG. 3, when the arms 20 are in the closed position, the driving device 22 feeds the strap R into the guide 26. The sensor 31 (FIGS. 1 and 2) detects the presence of the strap R in the guide 26 in a given or designated position and provides the relevant signals to the control unit 14.

With reference to FIG. 4, the clamping device 21 closes the vice 36 around a portion of the strap R, so as to retain the strap R after receiving consent from the sensor 31. Next, the driving device 22 tightens the strap R around the elongated elements 2 and G, extracting the strap R from the guide 26. Once the strap R has been tightened around the elongated elements 2 and G, the junction device 23 joins the two overlapping portions of the strap R by the grippers 37, so as to close the strap R around the elongated elements 2 and G. The sensor 31 monitors the outcome of the joining operation and provides relevant signals to the control unit 14.

Subsequently, the cutting device 24 separates the strap R upstream of the joined portion by the knife 38.

With reference to certain, non-limiting embodiments of the present disclosure, all the steps of the operations involved in applying the strap R around the elongated elements 2 and G are remotely controlled by the control unit 14 located at the surface station 10.

With reference to FIGS. 7, 8 and 9, elongated elements are shown, which are joined by the system 1 through the application of straps R.

In the example shown in FIG. 7, a rigid or flexible pipe 42 is shown for the transport of process fluids from an underwater system. The pipe 42 is provided with a finned shell 43, which is shaped so as to mitigate the wake turbulence downstream of the pipe 42 and is formed by a series of pairs of facing half-shells 44. The pairs of half-shells 44 are distributed along the longitudinal direction of the pipe 42 at substantially regular intervals. The straps R are applied between two successive fins of each pair of half-shells 44.

In the example shown in FIG. 8, a rigid or flexible pipe 45 having a first diameter and a pipe or cable or optical fibre 46 having a second diameter substantially smaller than the first diameter are shown, which are joined by straps R by the system 1.

In the example shown in FIG. 9, a rigid or flexible pipe 47 is shown, to which the system 1 applies facing half-shells 48 by using straps R.

Figure 11:
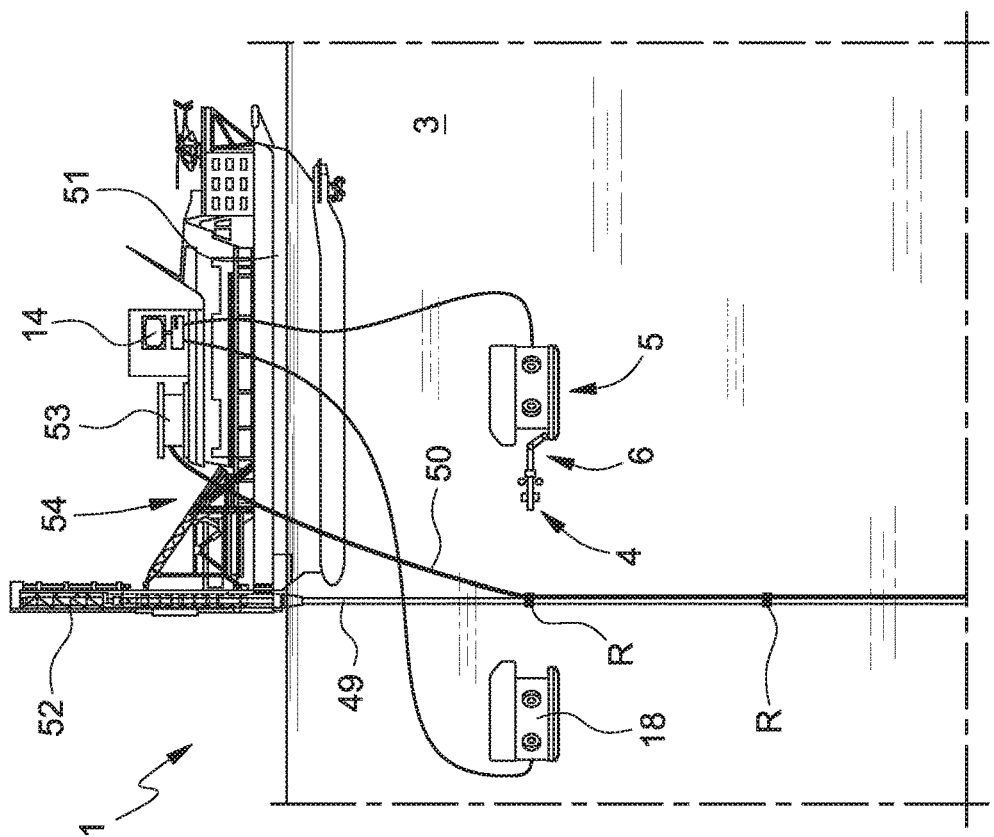
Figure 12:
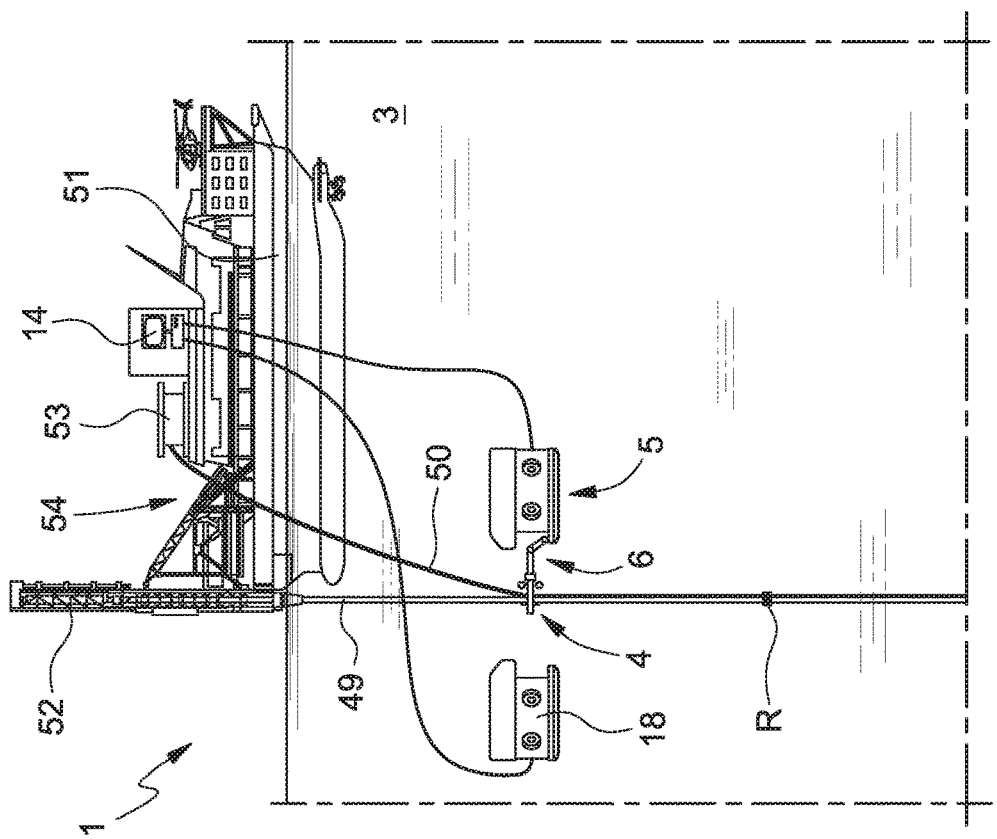

With reference to FIGS. 10, 11 and 12, three successive operating steps are shown for joining two elongated elements 49 and 50 in a body of water 3 following a step in which they are launched.

In the example shown in FIG. 10, a laying vessel 51 progressively releases the elongated element 49 into the body of water 3 by a launching tower 52. In the example shown, the elongated element 49 is an underwater pipe which is released into the body of water 3 as the pipe is assembled in the launching tower 52.

At the same time, the elongated element 50, in this case a cable, is launched into the body of water 3 by a reel 53 arranged on the deck 54 of the laying vessel 51.

The two elongated elements 49 and 50 are joined in the body of water 3 by a discrete succession of straps R, such as uniformly distributed along the elongated elements 49 and 50.

The control unit 14 is located on the launching vessel 51, which serves as a surface station.

With reference to FIG. 10, the articulated arm 6 arranges the apparatus 4 around the elongated element 50 and brings the elongated element 50 closer to the elongated element 49.

With reference to FIG. 11, the underwater vehicle 5 moves the apparatus 4 so as to place the elongated element 50 alongside the elongated element 49. The arms 20 (FIGS. 1, 2 and 3) of the apparatus 4 are in the closed position around both elongated elements 49 and 50.

With reference to FIG. 12, following the application of the strap R around the elongated elements 49 and 50, the underwater vehicle 5 moves the apparatus 4 away from the elongated elements 49 and 50.

Lastly, it is clear that the present disclosure can be subject to variations with respect to the embodiments described above or to the shape of the elongated element 50 which could be replaced with shells 48 launched by the crane of the vessel without however departing from the scope of protection of the attached claims. As such, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:
1. An apparatus comprising:
a frame;
a strap feeding device;
two arms, each arm configured to move with respect to the frame and configured to guide a strap around elongated elements in a body of water;
a clamping device configured to retain an end portion of the strap;
a driving device configured to advance the strap and tighten the strap around the elongated elements;
a junction device configured to join two overlapping portions of the strap to close the strap around the elongated elements; and
a cutting device configured to separate the strap upstream of the joined portions of the strap.

2. The apparatus of claim 1, wherein the two arms are hinged to the frame and configured to move to an open position to enable the two arms to be arranged relative to the elongated elements and to a closed position in which the two arms and the frame form a closed ring around the elongated elements.

3. The apparatus of claim 1, wherein each arm comprises a guide configured to enable the strap to advance along that arm.

4. The apparatus of claim 3, wherein each guide is bounded by facing fins mounted on the arm, the facing fins are shaped to define a guide channel for the strap, and have a stiffness to enable the facing fins to be opened for the strap to be pulled out of the guide when the strap is tightened around the elongated elements.

5. The apparatus of claim 1, further comprising a plurality of actuators to operate the two arms and operable with an emergency device configured to decouple the apparatus from the elongated elements.

6. A system comprising:
an apparatus comprising:
a frame;
a strap feeding device;
two arms, each arm being moveable with respect to the frame and configured to guide a strap around elongated elements in a body of water;
a clamping device configured to retain an end portion of the strap;
a driving device configured to advance the strap and tighten the strap around the elongated elements;
a junction device configured to join two overlapping portions of the strap to close the strap around the elongated elements; and
a cutting device configured to separate the strap upstream of the joined portions of the strap;
an underwater vehicle; and
an articulated arm connected to the underwater vehicle and to the apparatus, the articulated arm configured to control a position of the apparatus.

7. The system of claim 6, wherein the underwater vehicle comprises a remote operated vehicle.

8. The system of claim 6, further comprising:
a surface station connected to the underwater vehicle by an umbilical, and
a control device comprising a control unit located at the surface station and configured to control the underwater vehicle, the apparatus and the articulated arm.

9. The system of claim 8, wherein the control device comprises a sensor coupled to one of the two arms and configured to at least one of: monitor the position of the apparatus with respect to the elongated elements, and monitor a relative position of each of the two arms.

10. The system of claim 8, wherein:
the control device comprises a sensor coupled to the frame and configured to monitor a presence of the strap in a designated position, and
the junction device is controllable based on a signal provided by the sensor.

11. The system of claim 6, wherein the umbilical is configured to supply electrical power to the underwater vehicle and to exchange a signal with the underwater vehicle.

12. The system of claim 6, further comprising a further underwater vehicle configured to at least one of: check an operation of the apparatus and intervene responsive to an emergency.

13. The system of claim 6, wherein the articulated arm comprises:
 a plurality of elements articulatable with each other, and
 a plurality of hydraulic actuators configured to control a position of each of the elements with respect to each other, with respect to the underwater vehicle and with respect to the apparatus.

14. A method for joining elongated elements in a body of water, the method comprising:
 placing an apparatus in the body of water at a designated zone of the elongated elements;
 coupling the apparatus to the elongated elements by an underwater vehicle and an articulated arm placed between the underwater vehicle and the apparatus at the designated zone;
 guiding, by two arms of the apparatus, a strap around the elongated elements;
 tightening, by a driving device of the apparatus, the strap around the elongated elements; and
 joining, by a junction device of the apparatus, two overlapping portions of the strap such that the strap is closed around the elongated elements.

15. The method of claim 14, further comprising monitoring a position of the apparatus with respect to the elongated elements by a sensor.

16. The method of claim 14, further comprising detecting a presence of the strap at a designated position by a sensor.

17. The method of claim 14, further comprising remotely controlling a position of the apparatus.

18. The method of claim 14, further comprising:
 placing the apparatus in the body of water at a further specified zone of the elongated elements that is a specified distance from the designated zone; and
 applying a further strap around the elongated elements at the further specified zone.

* * * * *